(12) United States Patent
Musteata et al.

(10) Patent No.: US 9,218,225 B2
(45) Date of Patent: *Dec. 22, 2015

(54) DISCOVERING OBJECT DEFINITION INFORMATION IN AN INTEGRATED APPLICATION ENVIRONMENT

(75) Inventors: Oleg Musteata, Hayward, CA (US); Glen Bentley, Burlingame, CA (US); Yury Kosov, San Francisco, CA (US); Zeenat Kulkarni, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 528 days.

This patent is subject to a terminal disclaimer.

(21) Appl. No.: 13/556,192

(22) Filed: Jul. 23, 2012

(65) Prior Publication Data

US 2012/0291047 A1 Nov. 15, 2012

Related U.S. Application Data

(63) Continuation of application No. 12/142,650, filed on Jun. 19, 2008, now Pat. No. 8,302,107, which is a continuation of application No. 11/008,306, filed on Dec. 8, 2004, now Pat. No. 7,406,474.

(51) Int. Cl.
*G06F 9/54* (2006.01)
*H04L 29/08* (2006.01)

(52) U.S. Cl.
CPC ........ *G06F 9/54* (2013.01); *H04L 67/16* (2013.01); *H04L 67/28* (2013.01); *H04L 67/2838* (2013.01); *Y10S 707/99944* (2013.01); *Y10S 707/99945* (2013.01)

(58) Field of Classification Search
CPC ........ H04L 67/16; H04L 67/2838; G06F 9/54
See application file for complete search history.

(56) References Cited

U.S. PATENT DOCUMENTS 6,208,345 B1 * 3/2001 Sheard et al. ............... 715/853
6,256,676 B1 * 7/2001 Taylor et al. ............... 709/246

(Continued)

FOREIGN PATENT DOCUMENTS

JP 11073320 3/1999

OTHER PUBLICATIONS

Patent Abstract for JP11073320, published on Mar. 16, 1999, Total 1 p.

(Continued)

*Primary Examiner* — Charles E Anya
(74) *Attorney, Agent, or Firm* — David W. Victor; Konrad, Raynes, Davda and Victor LLP

(57) ABSTRACT

Provided is a method, system, and program for providing an object discovery agent (ODA) client. There is one object discovery agent (ODA) client and at least one ODA, wherein each ODA is associated with one application and includes: (i) application programming interfaces (APIs) to communicate with the associated application to discover definition information on objects maintained by the application and (ii) code to communicate with the ODA client. The ODA client communicates with one of the at least one ODA to cause the ODA to gather definition information on at least one object used by one application. The gathered object definition information is provided to an integration server to integrate the object in an environment including heterogeneous objects from different applications.

33 Claims, 6 Drawing Sheets

(56) References Cited

U.S. PATENT DOCUMENTS

| | | | |
|---|---|---|---|
| 6,523,027 | B1 | 2/2003 | Underwood |
| 6,539,396 | B1 | 3/2003 | Bowman-Amuah |
| 6,738,975 | B1 | 5/2004 | Yee et al. |
| 7,194,485 | B2 | 3/2007 | Kaipa et al. |
| 7,257,820 | B2 * | 8/2007 | Fischer et al. ............. 719/316 |
| 7,406,474 | B2 | 7/2008 | Musteata et al. |
| 2002/0052877 | A1 | 5/2002 | Okamoto et al. |
| 2003/0132963 | A1 * | 7/2003 | Barker et al. ............. 345/762 |
| 2003/0163472 | A1 | 8/2003 | Hartley et al. |
| 2003/0195875 | A1 | 10/2003 | Valk et al. |
| 2003/0220963 | A1 | 11/2003 | Golovinsky et al. |
| 2004/0059812 | A1 | 3/2004 | Assa |
| 2004/0168150 | A1 | 8/2004 | Ziv |
| 2004/0267876 | A1 | 12/2004 | Kakivaya et al. |
| 2005/0114394 | A1 | 5/2005 | Kaipa et al. |
| 2005/0114397 | A1 * | 5/2005 | Doshi et al. ............. 707/104.1 |
| 2005/0216282 | A1 | 9/2005 | Chen et al. |
| 2007/0265944 | A1 * | 11/2007 | Catahan et al. ............. 705/30 |
| 2008/0243895 | A1 | 10/2008 | Musteata et al. |

OTHER PUBLICATIONS

Yih, J., S.S. Fu, S.K. Chen, & S. Houillot, "An Active Adapter With Edge Cache Approach for Order Status Information Integration", Proceedings of the IEEE International Conference on E-Commerce Technology, Jul. 2004, Total 8 pp.

Notice of Allowance 1 for U.S. Appl. No. 11/008,306, dated Apr. 29, 2008, filed Dec. 8, 2004 by O. Musteata et al., Total 9 pp.

Office Action 1 for U.S. Appl. No. 11/008,306, dated Sep. 7, 2007, filed Dec. 8, 2004 by O. Musteata et al., Total 22 pp.

Response to Office Action 1 for U.S. Appl. No. 11/008,306, dated Dec. 28, 2007, filed Dec. 8, 2004 by O. Musteata et al., Total 12 pp.

Supplemental Response to Office Action 1 for U.S. Appl. No. 11/008,306, dated Mar. 27, 2008, filed Dec. 8, 2004 by O. Musteata et al.; Total 6 pp.

Office Action 1, for U.S. Appl. No. 12/142,650, dated Nov. 15, 2011, filed Jun. 19, 2008 by O. Musteata et al., Total 21 pp.

Final Office Action 1, for U.S. Appl. No. 12/142,650, dated Apr. 10, 2012, filed Jun. 19, 2008 by O. Musteata et al., Total 18 pp.

Notice of Allowance 1, for U.S. Appl. No. 12/142,650, dated Jun. 22, 2012, filed Jun. 19, 2008 by O. Musteata et al., Total 9 pp.

Response to Office Action 1, for U.S. Appl. No. 12/142,650, dated Feb. 15, 2012, filed Jun. 19, 2008 by O. Musteata et al., Total 14 pp.

Response to Office Action 2, for U.S. Appl. No. 12/142,650, dated Jun. 14, 2012, filed Jun. 19, 2008 by O. Musteata et al., Total 14 pp.

* cited by examiner

DISCOVERING OBJECT DEFINITION INFORMATION IN AN INTEGRATED APPLICATION ENVIRONMENT

CROSS-REFERENCE TO RELATED APPLICATION

This application is a continuation of U.S. patent application Ser. No. 12/142,650, filed Jun. 19, 2008, which is a continuation of U.S. patent application Ser. No. 11/008,306, filed Dec. 8, 2004 and issued as U.S. Pat. No. 7,406,474 on Jul. 29, 2008, all of which are incorporated herein by reference in their entirety.

BACKGROUND OF THE INVENTION

1. Field of the Invention

The present invention relates to discovering object definition information in an integrated application environment.

2. Description of the Related Art

In an integrated application environment, an integration server enables data to be integrated among heterogeneous applications and the data objects used by the heterogeneous applications. The integration server maintains a mapping for each application specific business object maintained in the integrated application environment that defines how the data in an application specific business object maps to a generic business object. In this way, data may be integrated among heterogeneous applications by transforming data from a source application specific business object to a generic business object and then from the generic business object to a target application specific business object. In this way data generated and maintained by a source application may be integrated with a target application.

Before the mapping can be generated, the user or developer of the integrated application environment needs to determine the definition and format of the business objects and then provide that definition to the integration server to generate the mappings.

SUMMARY

Provided is a method, system, and program for providing an object discovery agent (ODA) client. There is one object discovery agent (ODA) client and at least one ODA, wherein each ODA is associated with one application and includes: (i) application programming interfaces (APIs) to communicate with the associated application to discover definition information on objects maintained by the application and (ii) code to communicate with the ODA client. The ODA client communicates with one of the at least one ODA to cause the ODA to gather definition information on at least one object used by one application. The gathered object definition information is provided to an integration server to integrate the object in an environment including heterogeneous objects from different applications.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
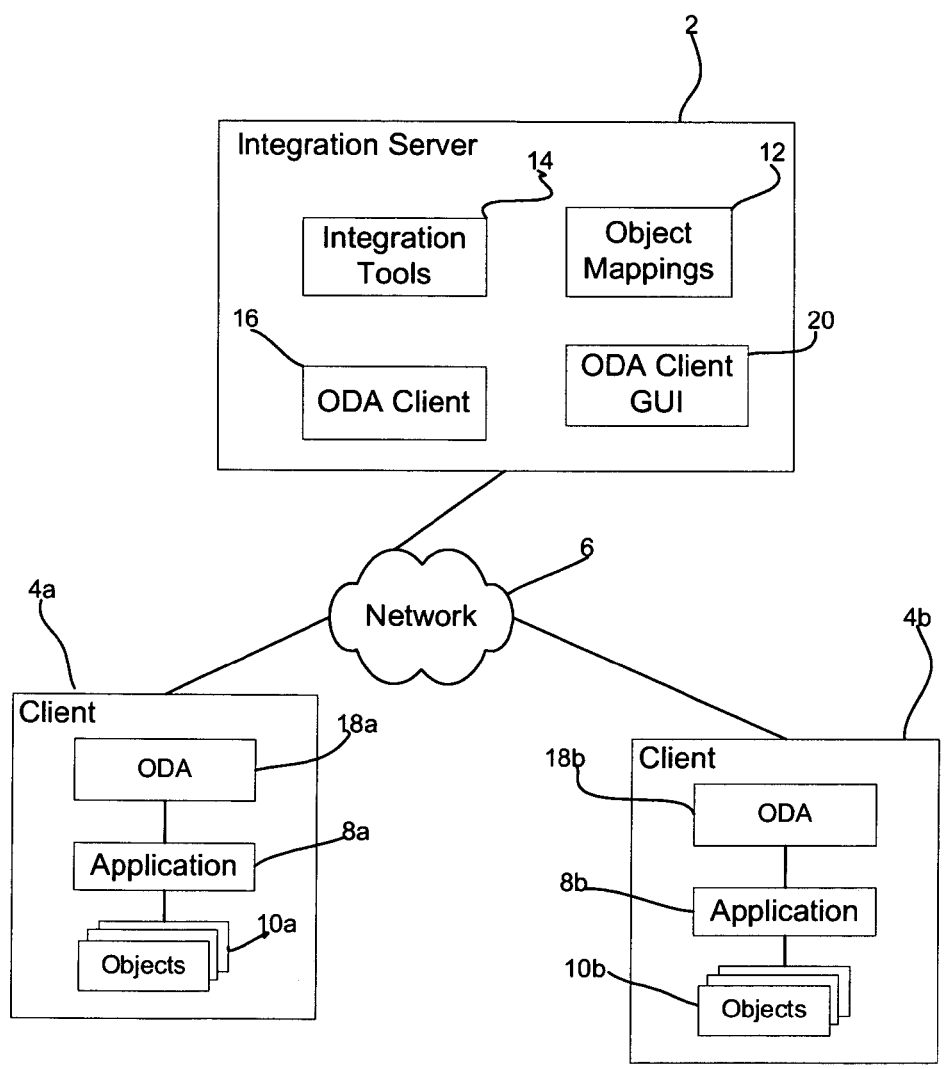
FIG. 1 illustrates an integrated application environment.

FIG. 1 illustrates an integrated application environment comprising an integrated server 2 and client systems 4a, 4b that connect over a network 6. The client systems 4a, 4b include heterogeneous applications 8a, 8b, where each heterogeneous application 8a, 8b uses one or more objects 10a, 10b that contain data used by the application. The objects 10a, 10b comprise application specific formats that may differ for different, heterogeneous applications 8a, 8b. For instance, the clients 4a, 4b may comprise different organizations that use different applications 8a, 8b for the same purpose, such as database applications or other business applications from different vendors. For database applications, the objects 10a, 10b may comprise the database tables or tablespaces used to store the data managed by the applications 8a, 8b. The integration server 2 provides services to integrate the data from the heterogeneous applications 8a, 8b and their application specific objects 10a, 10b, e.g., to allow data integration among database applications from different vendors. Although only one application 8a, 8b is shown in each client 4a, 4b, there may be multiple applications in each client, further there may be more than two clients. The clients may represent client systems, a network of systems or computational environments of disparate organizations that seek to integrate data through the integration server 2.

The integration server 2 maintains object mappings 12, which provides information to enable the integration server 2 to map the content of one application specific object 10a, 10b to a generic object and then map the content of the generic object to another application specific object 10a, 10b. In this way, information produced by the heterogeneous applications 8a, 8b stored in their heterogeneous objects 10a, 10b may be integrated. Integration tools 14 comprises development tools that the user would utilize to create the object mappings 12 and other complex artifacts the integration server 2 requires to provide enterprise application integration (EAI).

The user maintaining the integration server 2 may deploy an object discovery agent (ODA) client 16 and ODA 18a, 18b components that are used to collect definition information on the objects 10a, 10b. The integration server 2 uses this object definition information to generate the object mappings 12. The ODA client 16 may generate an ODA client graphical user interface (GUI) 20 that enables a user to control the ODA client 16 to interact with ODAs 18a, 18b to control how object definition information is gathered. For instance, the ODA client GUI 20 may enable the user to review objects 10a, 10b available at the applications 8a, 8b and select those objects 10a, 10b for which definition information is gathered to enable selective definition information gathering. In one embodiment, the ODA client 16 may be deployed at the integration server 2 and a separate ODA 18a, 18b is deployed for each application 8a, 8b in the system including the application 8a, 8b.

Figure 2:
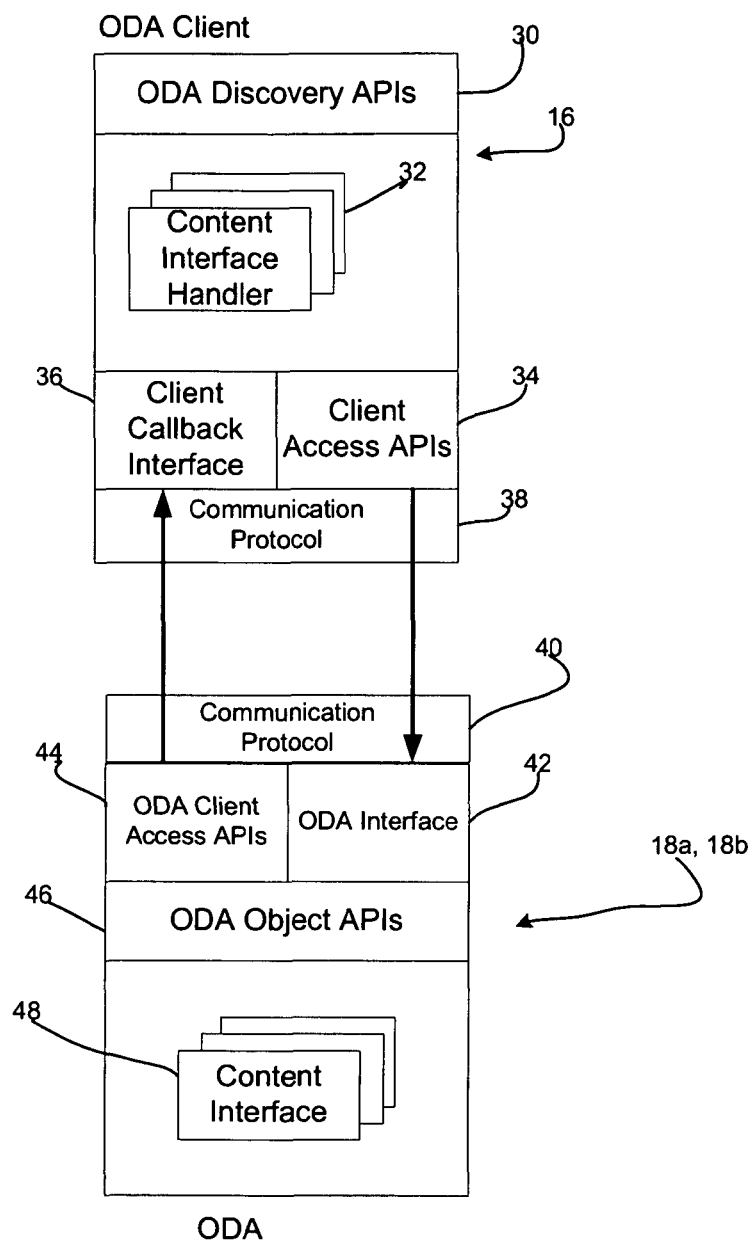
FIG. 2 illustrates an embodiment of an object discover agent (ODA) client and ODA.

FIG. 2 illustrates an embodiment of the ODA client 16 and ODA 18a, 18b components. The ODA client 16 includes ODA discover application programming interfaces (APIs) 30 that enable the ODA client 16 to connect to any implemented ODA 18a, 18b in the network 6 in a standard way. The content interfaces handlers 32 enable the ODA client 16 to access and process definition information from a particular application specific ODA 18a, 18b. There are multiple content interface handlers 32 if the definition information may be provided in different content types, e.g., Extensible Markup Language (XML), a text file, etc. Client access APIs 34 enable the ODA client 16 to communicate with each ODA 18a, 18b and the client callback interface 36 enables the ODA client 16 to respond to requests from the ODAs 18a, 18b and receive business definition information returned automatically by the ODA 18a, 18b as callback content. The ODA client 16 uses the client access APIs to access different ODAs 18a, 18b for different applications 8a, 8b. A communication protocol 38 enables the ODA client 16 to communicate with the ODAs 18a, 18b over the network 6 or within a single system if the ODA client 16 and ODA 18a are on a same platform.

The ODAs 18a, 18b include a communication protocol 40 layer that enables the ODAs 18a, 18b to communicate with the ODA client 16 over the network 6 or within a single system if the ODA client 16 and ODA 18a are on a same platform. ODA interfaces 42 comprise the methods and services that the ODA client 16 may invoke on the ODAs 18a, 18b via the client access APIs 34. The ODA Client Access APIs 44 comprise the APIs the ODAs 18a, 18b call to invoke operations and services on the ODA client 16. The ODA object APIs 46 comprise the APIs the ODAs 18a, 18b call to interface and communicate with the application 8a, 8b associated with the ODAs 18a, 18b and extract information on the objects 10a, 10b used by the application 8a, 8b. The content interfaces 48 provide the methods and interfaces to enable the ODAs 18a, 18b to package accessed object definition information in different content types, such as an XML file, text file, etc. The ODA object APIs 46 and content interfaces 48 are APIs written by the users to connect to specific applications 8a, 8b.

Figure 3:
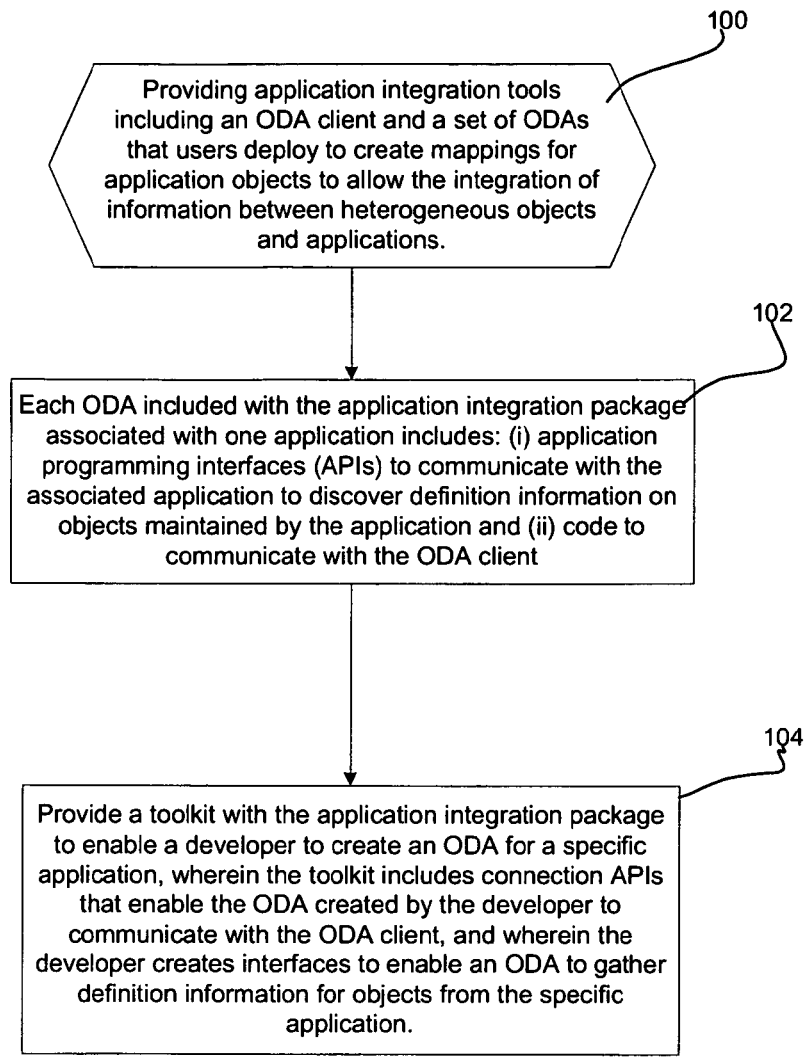
FIG. 3 illustrates operations to provide integration tools to enable the developer to create and deploy the ODA client and ODAs to gather object definition information.

FIG. 3 illustrates how a user of an integrated application environment may use the integration tools 14 to deploy the ODA client 16 and ODAs 18a, 18b to enable the integration of the applications at the integration server 2. The developer accesses (at block 100) application integration tools including an ODA client 16 and a set of ODAs 18a, 18b that are deployed to gather the object definition information used by the integration server 2 to create mappings 12 for application objects to allow the integration of data from heterogeneous objects 10a, 10b and applications 8a, 8b in the integrated application environment. Each ODA 18a, 18b provided in the integration tools 14 associated with one application includes: (i) application programming interfaces (APIs), e.g., ODA object APIs 46, to communicate with the associated application 8a, 8b to discover definition information on objects 10a, 10b maintained by the application 8a, 8b and (ii) code to communicate with the ODA client 16. The ODAs 18a, 18b provided with the integration tools 14 may comprise ODAs 18a, 18b provided by the vendor of the integration tools 14 for commonly used applications that the user may deploy to use immediately. The integration tools 14 may further include (at block 104) a toolkit to enable the user to create an ODA for a specific application. The toolkit includes certain infrastructure components the user incorporates into ODAs they develop to enable communication in a standard format with the ODA client 16, such as the ODA client access APIs 44, that the user includes in an ODA the user develops to discover object definition information from a specific application. The ODA client 16 includes APIs and interfaces to connect in a manner known in the art to any ODA 18a, 18b the user creates using the toolkit, which is part of the integration tools 14. The user creates interfaces, such as the ODA object APIs 46 and content interfaces 48, and packages them with certain of the ODA generic functions provided with the toolkit, such as the ODA client access APIs 44, ODA interface 42, and communication protocol 40 to create an ODA 18a, 18b. The user created ODA may then gather definition information for objects from the specific application. Further, for user created ODAs 18a, 18b, the user further codes the content interfaces 32 for the ODA client 16 to enable the ODA client 16 to access definition information in different content type formats. The provided ODA client 16 may then drive the discovery process with any ODAs the user creates using the interfaces and APIs for client ODA 16 communication provided in the toolkit.

Figure 4:
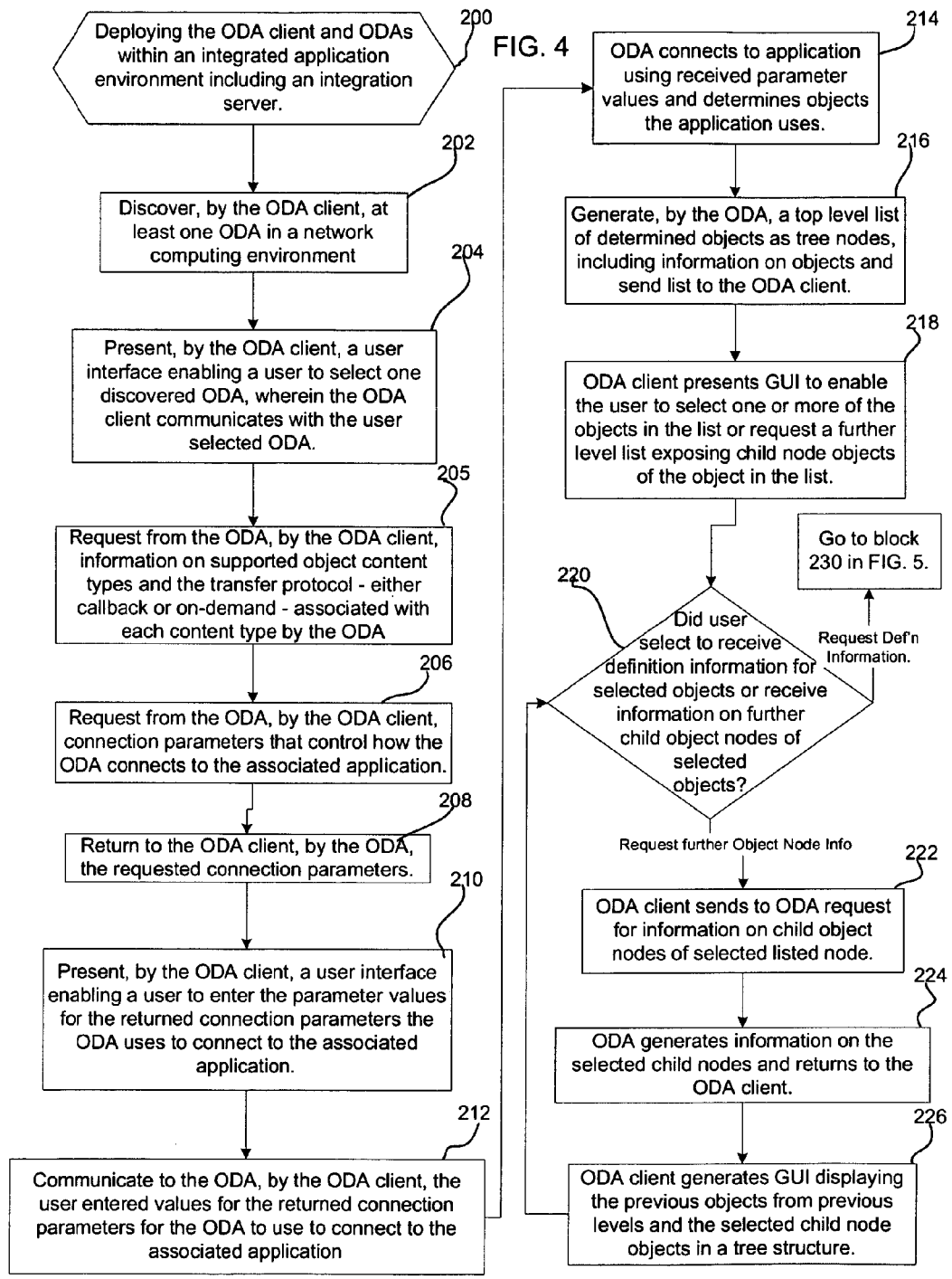
FIGS. 4, 5, and 6 illustrate embodiments of operations to discover and gather object definition information.
Figure 5:
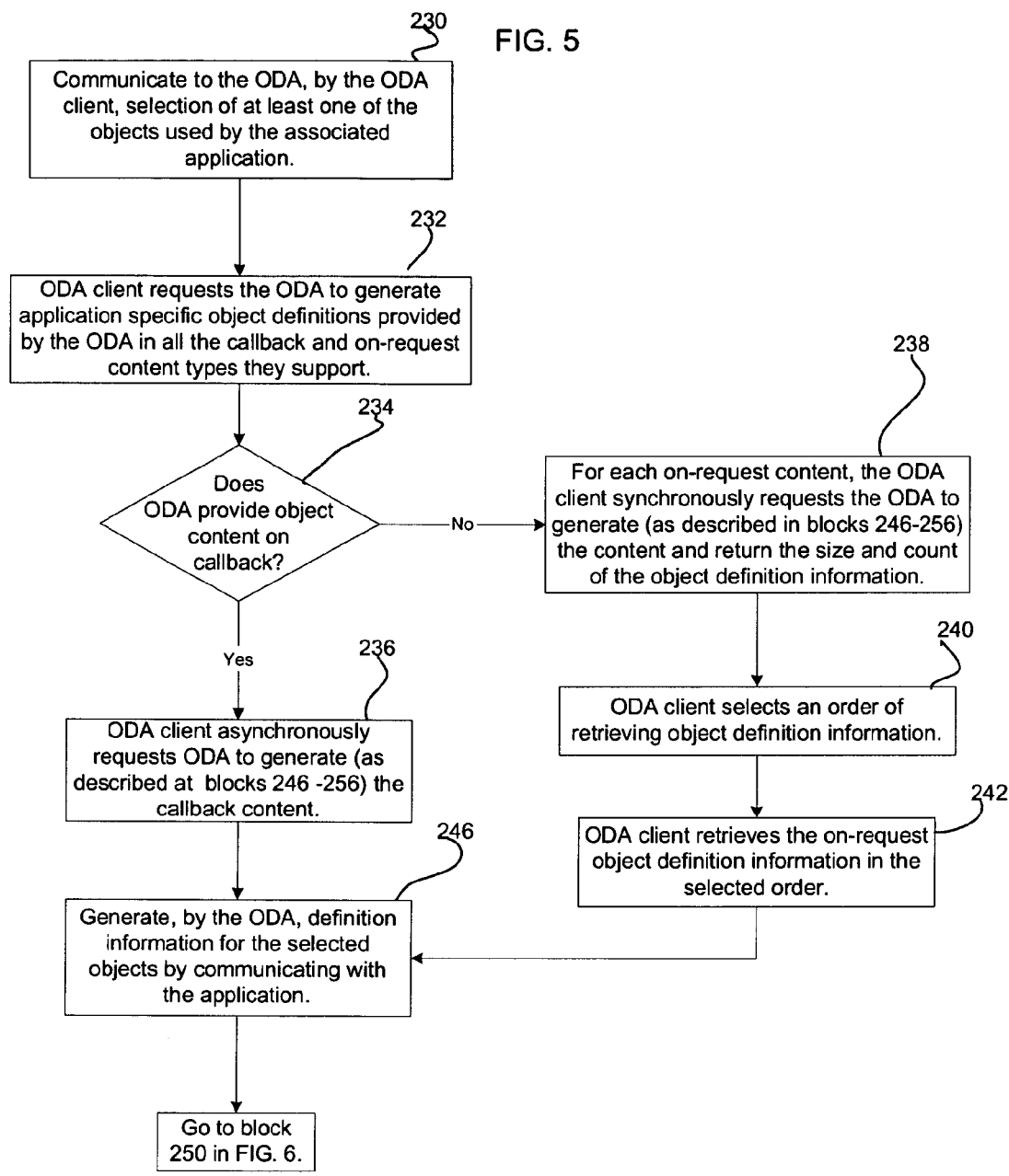
Figure 6:
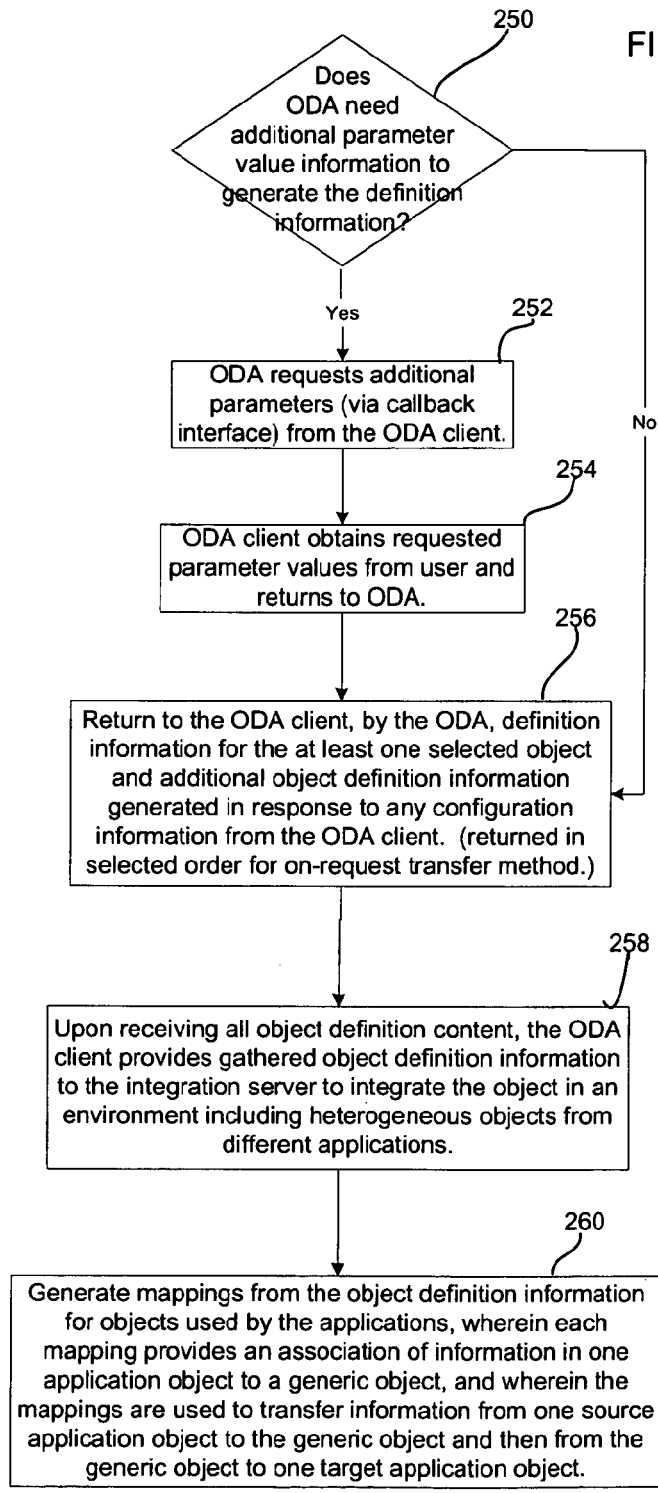

FIGS. 4 and 5 illustrate operations performed by the ODA client 16 and ODAs 18a, 18b to discover and gather object 10a, 10b definition information to provide to the integration server 12 to use to generate the object mappings 12. The user deploys (at block 200) the ODA client 16 and ODAs 18a, 18b within an integrated application environment including an integration server 2. The ODA client 16 discovers (at block 202) at least one ODA 18a, 18b in the network 6 environment. The ODA client 16 may present (at block 204) to the user creating the integrated application environment the ODA client GUI 20 to enable the user to select one discovered ODA 18a, 18b. The ODA client 16 then automatically communicates with the user selected ODA 18a, 18b. The ODA client 16 requests (at block 205) from the ODA 18a, 18b information on supported object content types and the transfer protocol—either callback or on-request—associated with each content type by the ODA. The ODA client 16 requests (at block 206) from the selected ODA 18a, 18b connection parameters that control how the ODA 18a, 18b connects to the associated application 8a, 8b. The ODAs 18a, 18b returns (at block 208) to the ODA client 16 the requested connection parameters. The ODA client 16 presents (at block 210) the GUI 20 to enable the user to enter the parameter values for the returned connection parameters the ODA 18a, 18b uses to connect to the associated application 8a, 8b. The ODA client 16 then communicates (at block 212) to the selected ODA 18a, 18b the user entered values for the returned connection parameters. The ODA 18a, 18b can specify information the user of the ODA client 16 must provide for the connection parameter, such as the name and primitive data type, whether the value is hidden or a password, if there are multiple values, a restricted list of possible values the user must select, a default value for the parameter, or a human readable description that explains the property and what input is required from the user. The ODA client 16 uses this information from the ODAs 18a, 18b to construct input collection and validation results to present to the user via the ODA client GUI 20 in a manner known in the art. The ODA 18a, 18b connects (at block 214) to the corresponding application 8a, 8b using the received parameter values and determines objects 10a, 10b the application 8a, 8b uses. The ODA 18a, 18b generates (at block 216) a top level list of determined objects 10a, 10b as tree nodes, including information on the objects 10a, 10b and sends the list to the ODA client 20. The ODA client 16 presents (at block 218) the GUI 20 to enable the user to select one or more of the objects in the list or request a further level list exposing child node objects of the object in the list. Each object node displayed in the GUI 10 may identify the following attributes: object name; object description; information on whether the object represented by node corresponds to an application object definition from which an integration broker application-specific business object can be created (is a generable node), or, is not a generable node; information on whether the represented object has a hierarchy of similar-in-nature child nodes and information on whether those child nodes can be provided by the ODA 18a, 18b in bulk or that the ODA enables the ODA client to search only for child nodes that satisfy a certain criteria only. The user of the ODA client GUI 20 may expand the hierarchy of object nodes multiple times to expose all nodes representing application objects of interest. Then, the user selects all objects of interest and instructs the ODA to generate application-specific business objects.

If (at block 220) the user selects to receive information on further child object nodes of selected objects 8a, 8b, then the ODA client 16 sends (at block 222) to the ODA 18 as, 18b a request for information on child object nodes of the selected listed object node. In response, the ODA 18a, 18b generates (at block 224) information on the selected child nodes and returns to the ODA client. The ODA client 16 generates (at block 226) the GUI 20 displaying the previous objects from previous levels and the selected child node objects in a hierarchical tree structure in the GUI 20. Control returns to block 220 to wait for further user action. When the user selects to receive definition information for selected objects from the hierarchical list of object nodes, control proceeds to block 230 in FIG. 5 to communicate to the ODA 18a, 18b selection of at least one of the objects 8a, 8b used by the associated application. At this point, the ODA client 16 requests (at block 232) the ODA 18a, 18b to generate application specific object definitions provided by the ODA 18a, 18b in all the callback and on-request content types they support.

For the content types transferred via the call back method, the ODA client 16 asynchronously waits for the ODA 18a, 18b to return definition information in the different content types (e.g., an XML file, flat file, etc.). If (at block 234) the ODA client 16 provides object content on a callback, then the ODA client 16 asynchronously requests (at block 236) the ODA 18a, 18b to generate (as described at blocks 246-256) the callback content. Otherwise, if the object definition information is provided by the ODA using the "on-request" transfer method, i.e., synchronously (from the no branch of block 234), then the ODA client 16 synchronously requests (at block 238), for each on-request content, the ODA 18a, 18b to generate (as described in blocks 246-256) the content and return the size and count of the object definition information. The ODA client 16 selects (at block 240) an order of retrieving object definition information and then retrieves (at block 242) the on-request object definition information in the selected order.

From block 236 or 242, the ODA generates (at block 246) the definition information for the selected objects 10a, 10b by communicating with the application 8a, 8b. With respect to FIG. 5, if (at block 250) the ODA 18a, 18b needs additional parameter value information to generate the definition information for the selected objects 10a, 10b, then the ODA 18a, 18b requests (at block 252) additional parameters (via the client callback interface 36) from the ODA client 16. The ODA client 16 obtains (at block 254) the requested parameter values from the user via the GUI 20 and returns to the parameter values to the ODA 18a, 18b to use to gather the definition information for the objects from the application 8a, 8b.

From block 248 or the no branch of 244, the ODA 18a, 18b returns (at block 256) to the ODA client 16 definition information for the at least one selected object 10a, 10b and additional object definition information generated in response to any configuration information from the ODA client. If the ODA client 16 had requested in the on-request transfer method an order to return object definition information in different content types, then the ODA 18a, 18b returns the definition information in the content types in the requested order. Both the definition information and additional definition information may be in the format of the selected content type.

Upon receiving (at block 258) all the object definition information, the ODA client 16 provides the gathered object definition information to the integration server 2 to integrate the object in an environment including heterogeneous objects from different applications. The integration server 2 may generate (at block 260) object mappings 12 from the object definition information for objects 10a, 10b used by the applications 8a, 8b, where each mapping provides an association of information in one application object to a generic object. The object mappings 12 are used to transform information from one source application object to the generic object and then from the generic object to one target application object.

Described embodiments provide techniques to enable a user of an integrated application environment to discover definition information for heterogeneous objects in the environment to enable the integration of information between heterogeneous objects and applications.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The illustrated operations of FIGS. 3, 4, 5, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   providing an object discovery agent (ODA) client;
   providing at least one ODA, wherein each ODA is associated with one application and includes: (i) application programming interfaces (APIs) to communicate with the associated application to discover definition information on objects maintained by the application and (ii) code to communicate with the ODA client;
   communicating, by the ODA client, with one of the at least one ODA to cause the ODA to gather definition information on at least one object used by one application;
   determining, by the ODA, whether additional parameters are needed to generate the definition information;
   in response to the determination that the additional parameters are needed, requesting by the ODA additional parameters from the ODA client; and
   providing gathered object definition information to an integration server to integrate the object in an environment including heterogeneous objects from different applications, wherein the integration server uses the object definition information to transform a source application object for which the object definition information is gathered to a generic object and from the generic object to another source application object.

2. The method of claim 1, further comprising:
   discovering, by the ODA client, at least one ODA in a network computing environment; and
   presenting, by the ODA client, a user interface enabling a user to select one discovered ODA, wherein the ODA client communicates with the user selected ODA.

3. The method of claim 1, wherein communicating, by the ODA client, with one ODA further comprises:
   requesting from the ODA, by the ODA client, connection parameters that control how the ODA connects to the associated application;
   returning to the ODA client, by the ODA, the requested connection parameters; and
   communicating to the ODA, by the ODA client, values for the returned connection parameters for the ODA to use to connect to the associated application.

4. The method of claim 3, further comprising:
   presenting, by the ODA client, a user interface enabling a user to enter the parameter values for the returned connection parameters the ODA uses to connect to the associated application.

5. The method of claim 1, wherein communicating, by the ODA client, with one ODA further comprises:
   communicating to the ODA client, by the ODA, information on objects used by the associated application;
   communicating to the ODA, by the ODA client, selection of at least one of the objects used by the associated application; and
   returning to the ODA client, by the ODA, definition information for the at least one selected object.

6. The method of claim 5, wherein the returned definition information for the at least one selected object comprises a top level list of objects, further comprising:
   requesting from the ODA, by the ODA client, information on child objects for the objects in the top level list;
   returning to the ODA client, by the ODA, information on child objects of at least one object indicated in the top level list; and
   determining, by the ODA client, whether to perform one of: (i) requesting from the ODA information on child objects of objects for which information has been returned or (ii) requesting from the ODA definition information for a selected at least one object for which information was provided to provide to the integration server.

7. The method of claim 6, further comprising:
   presenting, by the ODA client, a user interface enabling a user to control the ODA client to request information on child objects of presented objects or to request the definition information for the selected at least one object for the selected at least one object to return to the integration server.

8. The method of claim 1, wherein communicating, by the ODA client, with one ODA further comprises:
   receiving from the ODA, by the ODA client, information on content types supported by the ODA for providing the definition information; and
   requesting from the ODA, by the ODA client, definition information for at least one object used by the associated application in at least one of the supported content types.

9. The method of claim 8, further comprising:
   instructing, by the ODA client, the ODA to transfer definition information in at least one supported content type using one of an on-request or callback methods, wherein the on-request transfer method enables the ODA client to determine the order in which object definition information is returned by the ODA and the callback transfer method causes the ODA to automatically transmit definition information for least one object upon discovery of the definition information for the selected objects.

10. The method of claim 9, further comprising:
    receiving, by the ODA client, a size of the object definition information for content types in response to the ODA client instructing the ODA to use the on-request transfer method;
    determining, by the ODA client, an order in which the object definition information content types is to be received based on the size of the object definition information for the content types; and
    communicating, by the ODA client, the determined order to the ODA to use to transmit the object definition information.

11. The method of claim 1, wherein communicating, by the ODA client, with one ODA further comprises:
    communicating to the ODA client, by the ODA, information on objects used by the associated application;
    communicating to the ODA, by the ODA client, selection of one of the objects used by the associated application and configuration information for the ODA to use to generate additional object definition information; and
    returning to the ODA client, by the ODA, definition information for the at least one selected object including the additional object definition information generated in response to the configuration information from the ODA client.

12. The method of claim 1, wherein the ODA client is capable of connecting to a plurality of ODAs, each associated with a different application for obtaining object definition information for the application, further comprising:

generating mappings, by the integration server, from the object definition information for objects used by the applications, wherein each mapping provides an association of information in one application object to a generic object, and wherein the mappings are used to transform information from one source application object to the generic object and then from the generic object to one target application object.

13. The method of claim 12, wherein the ODA client and a set of ODAs associated with different applications are provided in an application integration package to enable users deploy to create mappings for application objects to allow the integration of information between heterogeneous objects and applications.

14. The method of claim 13, further comprising:
providing a toolkit with the application integration package to enable a developer to create an ODA for a specific application, wherein the toolkit includes connection APIs that enable the ODA created by the developer to communicate with the ODA client, and wherein the developer creates interfaces to enable an ODA to gather definition information for objects from the specific application.

15. A computing environment having a circuit and network, comprising:
an integration server including an object discovery agent (ODA) client;
a client system having an application and an ODA associated with the application, wherein the ODA includes:
(i) application programming interfaces (APIs) to communicate with the associated application to discover definition information on objects maintained by the application and
(ii) code to communicate with the ODA client;
wherein the ODA client and ODA comprise code that causes operations to be performed, the operations comprising:
(i) communicating, by the ODA client, with the ODA in the client system over the network to cause the ODA to gather definition information on at least one object used by the application in the client system;
(ii) determining, by the ODA, whether additional parameters are needed to generate the definition information;
(iii) in response to the determination that the additional parameters are needed, requesting by the ODA additional parameters from the ODA client; and
(iv) providing, by the ODA client, gathered object definition information to the integration server to integrate the object in an environment including heterogeneous objects from different applications, wherein the integration server uses the object definition information to transform a source application object for which the object definition information is gathered to a generic object and from the generic object to another source application object.

16. The computing environment of claim 15, wherein the operations caused by the ODA client and ODA code further comprise:
discovering, at least one ODA in a network computing environment; and
presenting a user interface enabling a user to select one discovered ODA, wherein the ODA client communicates with the user selected ODA.

17. The computing environment of claim 15, wherein the operations caused by the ODA client and ODA code further comprise:

requesting from the ODA, by the ODA client, connection parameters that control how the ODA connects to the associated application;
returning to the ODA client, by the ODA, the requested connection parameters; and
communicating to the ODA, by the ODA client, values for the returned connection parameters for the ODA to use to connect to the associated application.

18. The computing environment of claim 15, wherein communicating, by the ODA client, with one ODA further comprises:
communicating to the ODA client, by the ODA, information on objects used by the associated application;
communicating to the ODA, by the ODA client, selection of at least one of the objects used by the associated application; and
returning to the ODA client, by the ODA, definition information for the at least one selected object.

19. The computing environment of claim 15, wherein the ODA client is capable of connecting to a plurality of ODAs, each associated with a different application for obtaining object definition information for the application, wherein the integration server further includes integration code capable of causing operations, the operations comprising:
generating mappings from the object definition information for objects used by the applications, wherein each mapping provides an association of information in one application object to a generic object, and wherein the mappings are used to transform information from one source application object to the generic object and then from the generic object to one target application object.

20. An article of manufacture comprising a computer readable storage medium having code executed to communicate with an integration server and at least one computer system, including:
an object discovery agent (ODA) client;
at least one ODA, wherein each ODA is associated with one application and includes:
(i) application programming interfaces (APIs) to communicate with the associated application to discover definition information on objects maintained by the application and
(ii) code to communicate with the ODA client;
wherein the ODA client and the at least one ODA include code executed by the at least one computer system to perform operations, the operations comprising:
(i) communicating, by the ODA client, with one of the at least one ODA to cause the ODA to gather definition information on at least one object used by one application;
(ii) determining, by the ODA, whether additional parameters are needed to generate the definition information;
(iii) in response to the determination that the additional parameters are needed, requesting by the ODA additional parameters from the ODA client; and
(iv) providing gathered object definition information to an integration server to integrate the object in an environment including heterogeneous objects from different applications, wherein the integration server uses the object definition information to transform a source application object for which the object definition information is gathered to a generic object and from the generic object to another source application object.

21. The article of manufacture of claim 20, wherein the code for the ODA client and the at least one ODA is executed by the at least one computer system to perform operations further comprising:
  discovering, by the ODA client, at least one ODA in a network computing environment; and
  presenting, by the ODA client, a user interface enabling a user to select one discovered ODA, wherein the ODA client communicates with the user selected ODA.

22. The article of manufacture of claim 20, wherein communicating, by the ODA client, with one ODA further comprises:
  requesting from the ODA, by the ODA client, connection parameters that control how the ODA connects to the associated application;
  returning to the ODA client, by the ODA, the requested connection parameters; and
  communicating to the ODA, by the ODA client, values for the returned connection parameters for the ODA to use to connect to the associated application.

23. The article of manufacture of claim 22, wherein the code for the ODA client and the at least one ODA is executed by the at least one computer system to perform operations further comprising:
  presenting, by the ODA client, a user interface enabling a user to enter the parameter values for the returned connection parameters the ODA uses to connect to the associated application.

24. The article of manufacture of claim 20, wherein communicating, by the ODA client, with one ODA further comprises:
  communicating to the ODA client, by the ODA, information on objects used by the associated application;
  communicating to the ODA, by the ODA client, selection of at least one of the objects used by the associated application; and
  returning to the ODA client, by the ODA, definition information for the at least one selected object.

25. The article of manufacture of claim 24, wherein the returned definition information for the at least one selected object comprises a top level list of objects, wherein the code for the ODA client and the at least one ODA is executed by the at least one computer system to perform operations further comprising:
  requesting from the ODA, by the ODA client, information on child objects for the objects in the top level list;
  returning to the ODA client, by the ODA, information on child objects of at least one object indicated in the top level list; and
  determining, by the ODA client, whether to perform one of: (i) requesting from the ODA information on child objects of objects for which information has been returned or (ii) requesting from the ODA definition information for a selected at least one object for which information was provided to provide to the integration server.

26. The article of manufacture of claim 25, wherein the code for the ODA client and the at least one ODA is executed by the at least one computer system to perform operations further comprising:
  presenting, by the ODA client, a user interface enabling a user to control the ODA client to request information on child objects of presented objects or to request the definition information for the selected at least one object for the selected at least one object to return to the integration server.

27. The article of manufacture of claim 20, wherein communicating, by the ODA client, with one ODA further comprises:
  receiving from the ODA, by the ODA client, information on content types supported by the ODA for providing the definition information; and
  requesting from the ODA, by the ODA client, definition information for at least one object used by the associated application in at least one of the supported content types.

28. The article of manufacture of claim 27, wherein the code for the ODA client and the at least one ODA is executed by the at least one computer system to perform operations further comprising:
  instructing, by the ODA client, the ODA to transfer definition information in at least one supported content type using one of an on-request or callback methods, wherein the on-request transfer method enables the ODA client to determine the order in which object definition information is returned by the ODA and the callback transfer method causes the ODA to automatically transmit definition information for least one object upon discovery of the definition information for the selected objects.

29. The article of manufacture of claim 28, wherein the code for the ODA client and the at least one ODA is executed by the at least one computer system to perform operations further comprising:
  receiving, by the ODA client, a size of the object definition information for content types in response to the ODA client instructing the ODA to use the on-request transfer method;
  determining, by the ODA client, an order in which the object definition information content types is to be received based on the size of the object definition information for the content types; and
  communicating, by the ODA client, the determined order to the ODA to use to transmit the object definition information.

30. The article of manufacture of claim 20, wherein communicating, by the ODA client, with one ODA further comprises:
  communicating to the ODA client, by the ODA, information on objects used by the associated application;
  communicating to the ODA, by the ODA client, selection of one of the objects used by the associated application and configuration information for the ODA to use to generate additional object definition information; and
  returning to the ODA client, by the ODA, definition information for the at least one selected object including the additional object definition information generated in response to the configuration information from the ODA client.

31. The article of manufacture of claim 20, wherein the ODA client is capable of connecting to a plurality of ODAs, each associated with a different application for obtaining object definition information for the application, wherein the code for the ODA client and the at least one ODA is executed by the at least one computer system to perform operations further comprising:
  generating mappings, by the integration server, from the object definition information for objects used by the applications, wherein each mapping provides an association of information in one application object to a generic object, and wherein the mappings are used to transform information from one source application object to the generic object and then from the generic object to one target application object.

32. The article of manufacture of claim 31, further comprising:
   an application integration package including the ODA client and a set of ODAs associated with different applications to be deployed to enable users to create mappings for application objects to allow the integration of information between heterogeneous objects and applications.

33. The article of manufacture of claim 32, further including:
   a toolkit provided with the application integration package to enable a developer to create an ODA for a specific application, wherein the toolkit includes connection APIs that enable the ODA created by the developer to communicate with the ODA client, and wherein the developer creates interfaces to enable an ODA to gather definition information for objects from the specific application.

* * * * *